(12) United States Patent
McCollum

(10) Patent No.: US 10,527,077 B2
(45) Date of Patent: Jan. 7, 2020

(54) SELF-ALIGNING SYSTEM

(71) Applicant: Toshiba International Corporation, Houston, TX (US)

(72) Inventor: William L. McCollum, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 410 days.

(21) Appl. No.: 15/351,845

(22) Filed: Nov. 15, 2016

(65) Prior Publication Data
US 2018/0135671 A1    May 17, 2018

(51) Int. Cl.
*F16B 5/02*    (2006.01)
*F16B 43/00*    (2006.01)

(52) U.S. Cl.
CPC ............... *F16B 5/02* (2013.01); *F16B 43/00* (2013.01)

(58) Field of Classification Search
CPC .................................. F16B 5/02; F16B 43/00
See application file for complete search history.

(56) References Cited

U.S. PATENT DOCUMENTS

2015/0311606 A1* 10/2015 Meine ................... F16B 2/12
439/100
2017/0175800 A1*  6/2017 Nehls .................... F16B 43/00

* cited by examiner

*Primary Examiner* — Moshe Wilensky
(74) *Attorney, Agent, or Firm* — Baker Botts L.L.P.

(57) ABSTRACT

A self-aligning system for joining electronic cabinets to ensure alignment and prevent rotation and deformation is disclosed. Paired aligners, each comprising complementary alignment tabs and alignment notches, are brought together such that angled portions of the alignment tabs guide the opposing aligner into position, ensure proper alignment of the electronic cabinet structure, and prevent rotation of the aligners and structures as the aligners are brought together.

8 Claims, 2 Drawing Sheets

SELF-ALIGNING SYSTEM

FIELD

Embodiments described herein relate generally to a self-aligning system, and specifically to aligners operable to align and couple adjacent cabinet members to each other.

BACKGROUND

When installing many large electronic cabinets, including universal power supplies and server racks, it is beneficial to ensure all of the cabinets are properly aligned and secured. Existing methods to secure these cabinets comprise coupling the walls of cabinets together using fasteners. These methods require the cabinets be aligned in place and on the floor, which may be difficult as flooring is rarely perfectly flat. The walls of the cabinets may contain a cutout through which a fastener may be inserted. The fasteners used to couple cabinets together are typically cylindrical, as are the cutouts within the walls of cabinets through which the fasteners pass. The cylindrical cutouts in the walls and the shape of the fastener allow the bolt to rotate to engage a nut, thereby joining the walls of the cabinets to one another. However, the cylindrical shape of both the bolt and the cutout in the cabinet members allows both the bolt and cabinet members to rotate. Rotated members may cause misalignment between elements of the cabinet or with other cabinet members to which it is secured. Extreme misalignments may require pinning one cabinet member to another or shimming to level cabinet members, which may be difficult and time-consuming.

BRIEF DESCRIPTION OF THE DRAWINGS

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Embodiments described herein relate generally to a self-aligning system, and specifically to aligners operable to align and couple adjacent cabinet members to each other.

Illustrative embodiments of the present disclosure are described in detail herein. In the interest of clarity, not all features of an actual implementation may be described in this specification. It will, of course, be appreciated that in the development of any such actual embodiment, numerous implementation specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Hereinafter, embodiments will be described with reference to the drawings. Each drawing is a schematic view for describing an embodiment of the present disclosure and promoting the understanding thereof. The drawings should not be seen as limiting the scope of the disclosure. In each drawing, although there are parts differing in shape, dimension, ratio, and so on from those of an actual apparatus, these parts may be suitably changed in design taking the following descriptions and well-known techniques into account.

Figure 1:
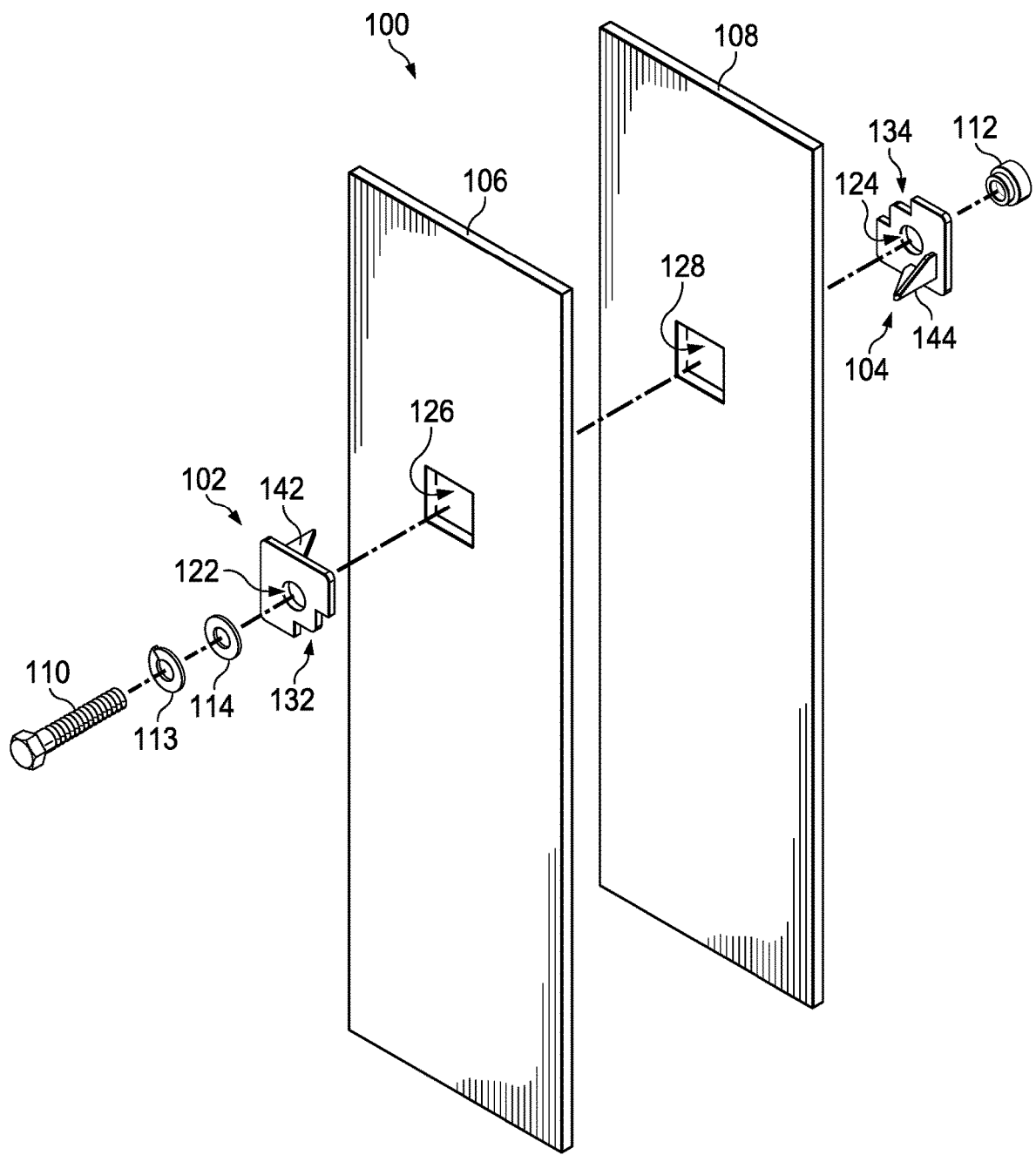
FIG. 1 illustrates an embodiment of a self-aligning system, including a first and a second structure, and a fastener operable to bring a first and a second aligner together, such that the first and the second structure are aligned, according to aspects of the present disclosure.

FIG. 1 illustrates an embodiment of a self-aligning aligner system. A pair of aligners 102, 104 are operable to align cabinet structures 106, 108 and one or more cutouts 126, 128 in the structures 106, 108. Structures 106, 108 are placed near one another such that cutouts 126, 128 are reasonably aligned. A first aligner 102 is positioned, at least partially, through the cutout 126 of the first structure 106 while a second aligner 104 is positioned, at least partially, through the cutout 128 of the second structure 108. A fastener 110 may be inserted through an opening 122 in the body of the first aligner 102, through the cutout 126 of the first structure 106 and the cutout 128 of the second structure 108, and through an opening 124 in the body of the second aligner 104. The first aligner 102 and the second aligner 104 are brought together when the fastener 110 engages the aligners 102, 104. As the aligners 102, 104 are brought together, the aligners 102, 104 may engage and align to one another. The aligners 102, 104 may also engage the structures 106, 108 such that the structures 106, 108 are brought together between the aligners 102, 104 such that the structures 106, 108 are substantially flush with one another.

In certain embodiments, the fastener 110 and at least one of the openings 122, 124 of the aligners 102, 104 may be threaded. The fastener 110 may pass through an unthreaded opening 122, 124 of an aligner 102, 104, if the opening of either aligner 102, 104 is unthreaded, and engage the threaded aligner, using the threading on the fastener 110 and the threading on the opening 122, 124 of the aligner, to thereby bring together the aligners 102, 104. In another embodiment, the fastener 110 may be threaded to engage a threaded nut 112 after passing through the openings 122, 124 of the aligners 102, 104. In such an embodiment, the openings 122, 124 of the aligners may be threaded to engage the fastener.

In certain embodiments, the system may further comprise one or more washers 113, 114. The washers 113, 114 may be operable to evenly distribute forces applied by the fastener 110 to the aligners 102, 104 by placing the washer between the fastener 110 and the aligner 102 (as shown) or between the aligner 104 and the nut 112 (washer not shown). Washers may also be inserted between the aligners 102, 104 and the structures 106, 108 (not shown). Even distribution of forces may prevent deformation of the aligners 102, 104 and the structures 106, 108. Washers may also reduce the chance of the fastener loosening with time.

The aligners 102, 104 may further comprise an alignment notch 132, 134 and an alignment tab 142, 144. When the aligners 102, 104 are brought together by the fastener 110, the alignment tab 142 of a first aligner 102 may engage the edges of the alignment notch 134 of a second aligner 104 and the alignment tab 144 of the second aligner 104 may engage the edges of the alignment notch 132 of the first aligner 102. As the aligners 102, 104 are brought together, the alignment tabs 142, 144 and alignment notches 132, 134 ensure the aligners 102, 104 are aligned. The alignment tab of the first aligner 102, the alignment tab of the second aligner 104, or the alignment tabs of both aligners may engage the edges of the cutouts 126, 128 of the structures 106, 108 to ensure alignment of the structures 106, 108 when the aligners 102, 104 are brought together by the fastener 110.

In certain embodiments, the cutouts 126, 128 of the structures 106, 108 and shape of the aligners 102, 104 may prevent rotation of the aligners 102, 104 and structures 106, 108. By way of example and not limitation, the aligners 102, 104 and the cutouts 126, 128 may be substantially identical in shape and size, including the rectangular shape shown in FIG. 1, such that the aligners 102, 104 may engage the cutouts 126, 128 and the edges of the cutouts 126, 128 prevent rotation of the aligners 102, 104. In another embodiment, the shape of the cutouts 126, 128 and the alignment tabs 142, 144 of the aligners 102, 104 may ensure the structures 106, 108 are properly aligned as the system is coupled together. As shown in FIG. 1, the alignment tabs 142, 144 of the first and second aligners 102, 104, may engage the edges of the cutouts 126, 128 before engaging the alignment notches 134, 132 of the second and first aligners 104, 102, respectively. When the aligners 102, 104 are properly aligned and secured by the fastener 110, the cutouts 126, 128 of the structures 106, 108 may also be aligned and ensure the alignment of the structures 106, 108 with one another, while preventing the aligners 102, 104 or structures 106, 108 from rotating.

In yet another embodiment, a structure 106, 108 may comprise a cutout 126, 128 and a recessed area (not shown) around the cutout 126, 128, such that the alignment tabs 142, 144 of the aligners 102, 104 may be inserted within the cutouts 126, 128 and the body of the aligner 102, 104 may fit within the recess. In such an arrangement, the alignment tab 142, 144 of the aligner 102, 104 may prevent rotation and align the structure by engaging the edges of the cutout 120, and the aligner 102, 104 itself may prevent rotation and align the structure by engaging the edges of the recess (not shown) of the structure 106, 108. The recess (not shown) and cutout 126, 128 may be substantially identical in shape and size to prevent rotation of the aligners 102, 104 as the aligners 102, 104 are brought together within the cutouts 126, 128. The recess (not shown) and aligners may be designed such that the depth of the recess (not shown) corresponds to the thickness of the aligner 102, 104 such that the aligner 102, 104 may become flush with the surface of the structure 106, 108 when the aligners 102, 104 are brought together.

In certain embodiments, the structures 106, 108 may comprise one cutout 126, 128. The cutout 126, 128 may be centrally aligned within the structure 106, 108. In other embodiments, one or more cutouts 126, 128 may be placed in one or more corners of the structures 106, 108 or along the sides of the structure 106, 108 (not shown). For heavier loads, structures 106, 108 may be aligned using more than one pair of aligners 102, 104 that are joined through more than one cutouts 126, 128 (not shown). In yet another embodiment, the structure 106, 108 may comprise posts (not shown) to add strength and rigidity. The posts (not shown) may further comprise the aligners 102, 104 such that a post (not shown) may be joined and aligned to another post (not shown) using the aligners 102, 104.

Figure 2:
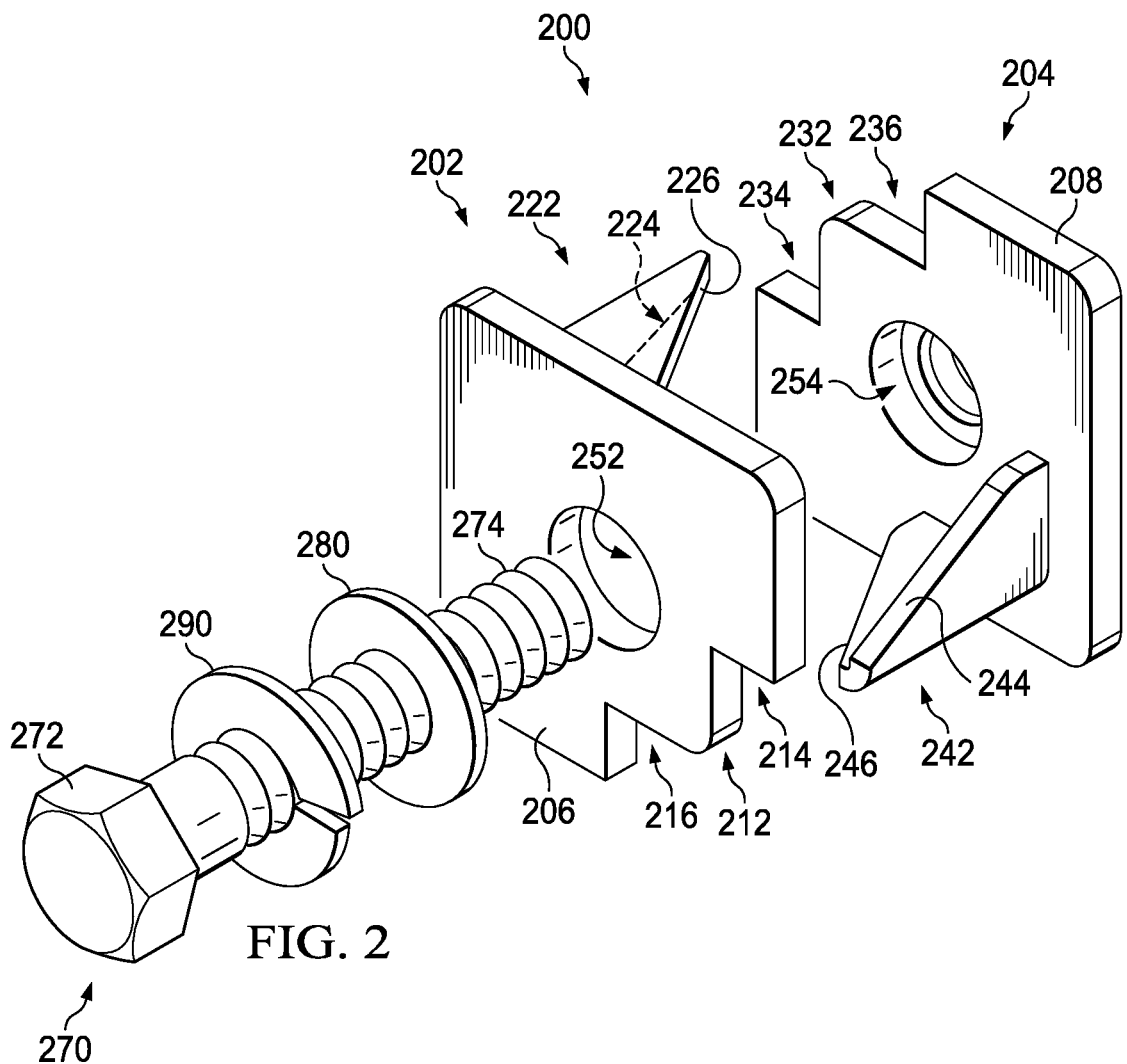
FIG. 2 is an exploded view of the self-aligning assembly, including a first and a second aligner, and a fastener operable to bring the first and the second aligner together, according to aspects of the present disclosure.

FIG. 2 illustrates an exploded view of the fastener assembly. An aligner 202, 204 comprises a body 206, 208. The body 206, 208 may comprise one or more alignment notches 212, 232. By way of example and not limitation, an alignment notch 212, 232 may comprise a vertical alignment notch 214, 234 and a horizontal alignment notch 216, 236. The vertical alignment notches 214, 234, and horizontal alignment notches 216, 236 may intersect as shown in FIG. 2. If intersecting, the horizontal and vertical alignment notch may intersect at a 90 degree angle, as shown in FIG. 2, or another angle.

An aligner 202, 204 may further comprise one or more alignment tabs 222, 242. The alignment tab 222, 242 may further comprise a sloped portion, such that the tab narrows as it projects from the aligner body. By way of example and not limitation, an alignment tab 222, 242 may comprise a horizontal alignment tab 226, 246 and a vertical alignment tab 224, 244. The horizontal alignment tab 226, 246 may comprise a horizontally sloped portion where it narrows as it projects from the aligner body, and a vertical alignment tab 224, 244 may comprise a vertically sloped portion where it narrows as it projects from the body. The horizontally and vertically sloped portions may enable opposing aligners to slide into alignment as the aligners 202, 204 are brought together. The horizontal alignment tabs 226, 246, and vertical alignment tabs 224, 244, may intersect as shown in FIG. 2. If intersecting, the horizontal alignment tabs 226, 246 and the vertical alignment tabs 224, 244 may intersect at a 90 degree angle, as shown in FIG. 2, or another angle.

An alignment tab of one aligner may be operable to engage the edges of an alignment notch of another aligner when the two aligners are brought together. By way of example and not limitation, an alignment tab 242 on a second aligner 204 may be operable to engage the edges of an alignment notch 212 of a first aligner 202, and an alignment tab 222 of the first aligner 202 may be operable to engage the edges of an alignment notch 232 of the second aligner 204 as the aligners 202, 204 are brought together. If the alignment tab 242 of one aligner 204 comprises a vertical alignment tab 244 that intersects a horizontal alignment tab 246 at a specific angle, for example 90 degrees, the alignment notch 212 of the opposing aligner 202 may similarly comprise a vertical alignment notch 214 and a horizontal alignment notch 216 that also intersect at the same angle, in this example 90 degrees, such that the aligners may be brought together. By way of example and not limitation, the vertical alignment tab 244 and the horizontal alignment tab 246 of the second aligner 204 may engage the edges of the vertical alignment notch 214 and the edges of the horizontal alignment notch 216 of the first aligner 202, respectively, while the vertical alignment tab 224 and the horizontal alignment tab 226 of the first aligner 202 may engage the edges of the vertical alignment notch 234 and the edges of the horizontal alignment notch 236 of the second aligner 204, respectively. Specifically, the sloped portions of the alignment tabs 222, 242 may engage and enable the tabs to slide along the edges of the notches 212, 232 to align the aligners 202, 204 as the aligners are brought together. Any structures placed between the aligners 202, 204 may similarly be aligned as the aligners are brought together by the tabs engaging the edges of the cutouts of the structures (see FIG. 1). In certain embodiments, an alignment tab 222, 242 and an alignment notch 212, 232 of an aligner may appear on opposite corners of the body 206, 208 of an aligner 202, 204, as shown in FIG. 2. In other embodiments, an alignment tab 222, 242 may appear adjacent to an alignment notch 212, 232 along one side of the body 206, 208 of an aligner 202, 204 (not shown) or in other configurations not described.

The body 206, 208 of the aligner 202, 204 may further comprise an opening 252, 254 operable to receive a fastener 270. The opening 252, 254 may be centrally aligned to the body 206, 208 of the aligner 202, 204. By way of example and not limitation, the fastener 270 may comprise a bolt, which may be threaded. For example, the fastener may be a ½-13 bolt that is approximately 1.5" long. If threaded, the body 274 of the fastener 270 may be completely or partially threaded. The fastener 270 may be inserted into the hole 252 in the body 206 of a first aligner 202 and then through the hole 254 in the body 208 of a second aligner 204. Once inserted through the aligners 202, 204, the fastener 270 may engage the first aligner 202 and the second aligner 204 to bring the aligners together. In certain embodiments, the fastener 270 may be a bolt with a head 272 operable to engage the body 206 of the first aligner 202. The fastener may engage the body 208 of the second aligner 204, directly or indirectly, by coupling with a nut (not shown) after passing through the second aligner 204 to bring the aligners 202, 204 together. The nut (not shown) may be threaded to couple with the fastener 270. The nut (not shown) may be coupled to the body 206, 208 of one of the aligners 202, 204. As shown in FIG. 1, a washer 280 and a lock washer 290 may be placed between the fastener 270 and the aligner 202. In other embodiments, the washers 280, 290 may be placed between the nut (not shown) and the aligner 204, or in both places. In yet other embodiments, the nut (not shown) may be welded to the body of the aligner 202, 204 or die-cast as part of the body of the aligner 202, 204, thereby preventing washers 280, 290 from being placed between the aligner 202, 204 and the nut (not shown).

In certain embodiments, for example, the body of an aligner may be approximately 2" square of approximately 3/16" thick metal, but may vary in thickness and size based on the requirements necessary to fasten and align cabinet structures of different sizes and weights. Cabinet structures may range from approximately 12" wide, 24" deep and 36" tall to more than 48" wide, 48" deep, and 78" tall. The alignment tabs projecting from the aligner may be approximately 1 9/16" tall and wide and project approximately 1 1/16" from the aligner body. The tabs may be welded to the aligner body or may be die-cast as part of the aligner body. The cutouts in the structures may be approximately 1 9/16" square openings to correspond to the height and width of the alignment tabs. All materials may be constructed of steel or similar metals.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system for aligning adjacent structures comprising:
a first structure comprising a first cutout;
a second structure comprising a second cutout, wherein the first cutout is adjacent to the second cutout;
a first aligner operable to be disposed within the first cutout comprising:
  a first aligner body comprising:
    a first opening operable to receive a fastener; and
    a first notch and a second notch; and
    a first tab and a second tab projecting from the first aligner body, wherein the first tab is coupled to the second tab, wherein the first tab is perpendicular to the second tab;
a second aligner operable to be disposed within the second cutout comprising:
  a second aligner body comprising:
    a second opening operable to receive a fastener; and
    a third notch and a fourth notch; and
    a third tab and a fourth tab projecting from the second aligner body, wherein the third tab is coupled to the fourth tab, wherein the third tab is perpendicular to the fourth tab; and
a fastener operable to be disposed within the first opening and the second opening, wherein the fastener is operable to engage the first aligner and the second aligner, wherein the first tab is operable to engage an edge of the third notch, wherein the second tab is operable to engage an edge of the fourth notch, wherein the third tab is operable to engage an edge of the first notch, and wherein the fourth tab is operable to engage an edge of the second notch.

2. The system of claim 1, wherein the first notch is coupled to the second notch, and wherein the third notch is coupled to the fourth notch.

3. The system of claim 1, wherein the first notch and the second notch are axially opposed to the third tab and the fourth tab, and wherein the third notch and the fourth notch are axially opposed to the first tab and the second tab.

4. The system of claim 1, wherein the first tab narrows as the first tab projects from the first aligner body, wherein the second tab narrows as the second tab projects from the first aligner body, wherein the third tab narrows as the third tab projects from the second aligner body, and wherein the fourth tab narrows as the fourth tab projects from the second aligner body.

5. The system of claim 1, wherein at least one of the first tab and the second tab are operable to engage an edge of the first cutout and the second cutout, and at least one of the third tab and the fourth tab are operable to engage an edge of the first cutout and the second cutout.

6. The system of claim 1, wherein at least one of the first aligner body and the second aligner body further comprises a nut operable to engage the fastener.

7. The system of claim 1, wherein the first tab and the third tab are vertically aligned and the second tab and the fourth tab are horizontally aligned.

8. The system of claim 1, wherein the first structure and the second structure are operable to contain equipment selected from the group consisting of electronics equipment, electrical switching equipment, battery equipment, uninterruptible power supply equipment, air conditioning equipment, and computer server equipment.

* * * * *